Feb. 24, 1953 E. H. KUEHN ET AL 2,629,217
HARROW WITH YIELDING TOOTH BARS
Filed Jan. 27, 1947 2 SHEETS—SHEET 1

Inventor
Emil H. Kuehn
Tilden M. Larson

By *Clarence A. O'Brien
and Harvey B. Jacobson*
Attorneys

Feb. 24, 1953

E. H. KUEHN ET AL 2,629,217

HARROW WITH YIELDING TOOTH BARS

Filed Jan. 27, 1947

Inventor

Emil H. Kuehn
Tilden M. Larson

By *Clarence A. O'Brien
and Harvey B. Jacobson*
Attorneys

Patented Feb. 24, 1953

2,629,217

UNITED STATES PATENT OFFICE 2,629,217

HARROW WITH YIELDING TOOTH BARS

Emil H. Kuehn and Tilden M. Larson, Mazeppa, Minn.

Application January 27, 1947, Serial No. 724,598

1 Claim. (Cl. 55—131)

The present invention relates to new and useful improvements in harrows and more particularly to drag-harrows having harrow teeth carried by pivotally supported tooth bars and providing spring means for maintaining the teeth in a downwardly extended position, the teeth being yieldable to spring upwardly upon contact with an obstruction to thus avoid the breaking of a harrow tooth or bar.

A further object of the invention is to provide means for adjusting the tension of the spring in accordance with the character of the soil being worked by the harrow.

A further object of the invention is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
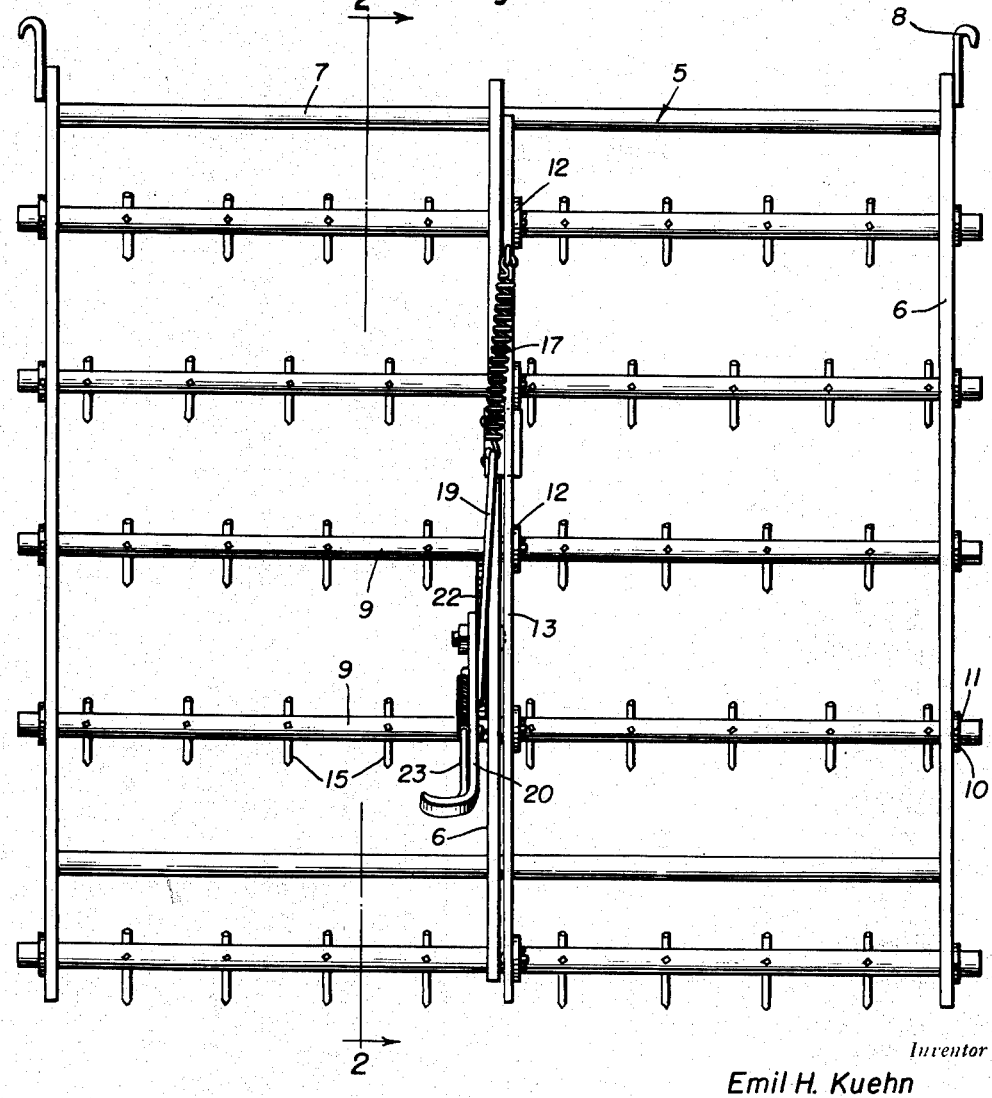
Figure 1 is a top plan view.

Referring now to the drawings in detail wherein for the purpose of illustration we have disclosed a preferred embodiment of the invention the numeral 5 designates the harrow frame generally which includes a plurality of longitudinally extending frame members 6 connected in spaced parallel relation by cross frame members 7. The front ends of the frame members 6 are provided with hooks 8 by means of which the harrow may be attached to a tractor or other vehicle for dragging the harrow over the ground.

A plurality of transversely extending tooth bars 9 are pivotally supported at their ends in the longitudinal frame member 6 and are secured against endwise movement by collars 10 held in position on the tooth bar by set screws 11, the collars bearing against the outer side of the frame member 6.

Projecting outwardly from each of the tooth bars 9 is an arm 12, the arms being fixed at their lower ends to the tooth bars and pivotally connected at their upper ends to a longitudinally extending connecting bar 13 by means of pins 14, all of the tooth bars thus being connected for uniform pivotal or rotary movement in the frame member 6.

The tooth bars 9 are provided with the usual harrow teeth 15 secured adjacent their upper ends to the tooth bars by bolts and nuts 16.

A coil spring 17 is connected at one end to the forward portion of the connecting bar 13 by means of a hook 18 carried by the connecting bar, the spring extending rearwardly and is connected at its rear end to a rod or link 19 which in turn is connected to the intermediate portion of a spring adjusting lever 20. The lever 20 is pivoted at its lower end to a central longitudinally extending frame member 6 by means of a pin 21.

An arcuate tooth plate 22 is also secured to the central frame member 6, the teeth of the plate being engageable by the lower end of the locking dog 23 slidably mounted in guides 24 carried by the lever 20, the dog being projected downwardly by the coil spring 25 carried thereby to maintain the dog in locking engagement with the teeth of the plate 22 in the usual manner.

Figure 2:
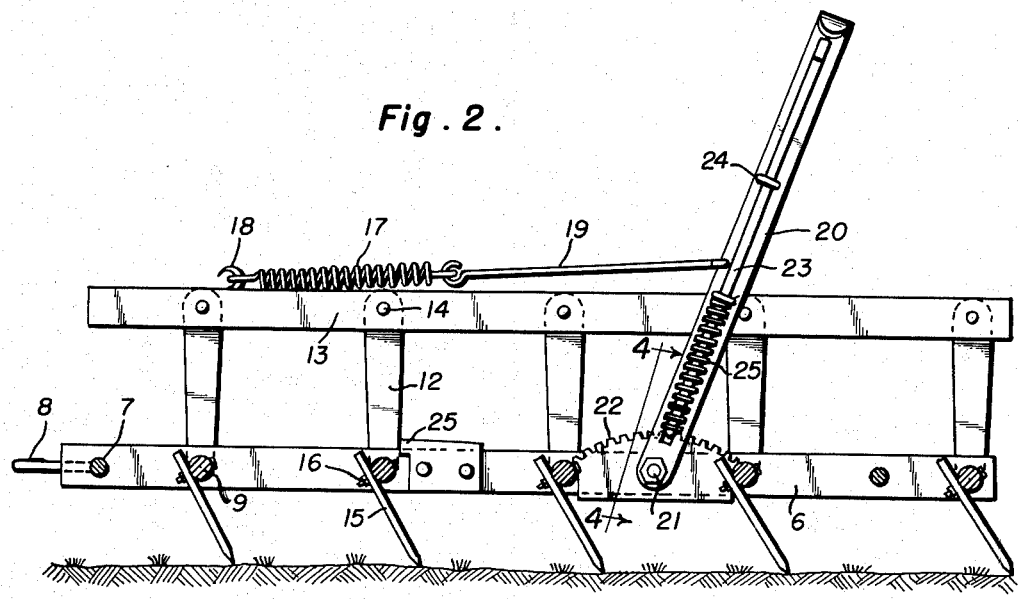
Figure 2 is a longitudinal sectional view taken on a line 2—2 of Figure 1 and showing the harrow teeth in their lowered position.

In the operation of the device, with the locking dog 23 held engaged with the teeth of the plate 22 the spring 17 will be maintained under tension whereby to urge the connecting bar 13 rearwardly and with the arms 12 in a perpendicular position and limited against rearward swinging movement by engagement of one of the arms with a stopper 25 secured to the central longitudinal frame 6 as shown in Figure 2 of the drawings. In this position the teeth 15 are held in a rearwardly inclined position.

Figure 3:
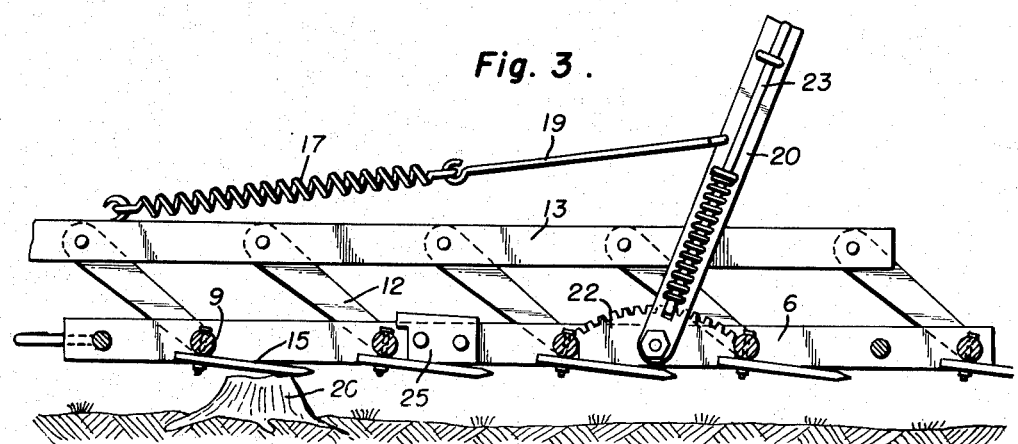
Figure 3 is a similar view showing the harrow teeth raised when striking an obstruction.
Figure 4:
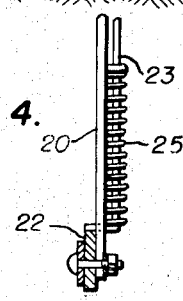
Figure 4 is a fragmentary sectional view taken on a line 4—4 of Figure 2.

As the harrow is dragged over the ground and should one of the teeth 15 engage an obstruction such as shown at 26 in Figure 3 of the drawings, all of the teeth will swing rearwardly to clear the obstruction and thus prevent breaking of the teeth. The spring 17 will return the teeth to their normal position.

The tension of the spring 17 may be increased or decreased by swinging the lever 20 rearwardly or forwardly.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is

What we claim is:

A drag harrow comprising a frame having a plurality of transverse pivoted rockable bars, teeth carried by said bars and swung rearwardly when said bars are rocked, arms fixed to said bars and adapted to hold said bars in selected rockable positions, a connecting bar for said arms, a lever pivoted to said frame, a coil spring connecting the lever to the connecting bar to exert tension against the connecting bar and arms for preventing said tooth bars from rocking, latch means for securing the lever in different adjusted positions, and a stop carried by the frame for engaging one of the arms and providing for said spring being variably tensioned in the different adjusted positions of said lever to variably tension said teeth against swinging.

EMIL H. KUEHN.
TILDEN M. LARSON.

REFERENCES CITED

The following references are of record in the file of this patent:

UNITED STATES PATENTS

| Number | Name | Date |
| --- | --- | --- |
| 711,956 | Furthmiller | Oct. 28, 1902 |
| 1,176,334 | Bergman | Mar. 21, 1916 |
| 2,236,780 | Oerman | Apr. 1, 1941 |
| 2,321,663 | Donovan | June 15, 1943 |
| 2,429,013 | Barrentine | Oct. 14, 1947 |